(12) United States Patent
Gasteyer, III et al.

(10) Patent No.: US 6,335,074 B1
(45) Date of Patent: Jan. 1, 2002

(54) LOW WARPAGE INSULATED PANEL DESIGN

(75) Inventors: Theodore Hall Gasteyer, III; Gary Dee Lang, both of Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/516,166

(22) Filed: Feb. 29, 2000

(51) Int. Cl.[7] ............................. B32B 1/06; B32B 15/04; B32B 3/10

(52) U.S. Cl. ............................. 428/76; 428/75; 428/68; 52/406.1; 52/406.2; 312/296; 312/400; 312/405; 312/406.1; 49/34

(58) Field of Search ............................. 428/68, 69, 71, 428/75, 76; 52/406.1, 406.2; 312/296, 405, 406.1, 400; 49/34

(56) References Cited

U.S. PATENT DOCUMENTS 3,754,675 A * 8/1973 Richard et al. .......... 220/9 LG 5,695,844 A * 12/1997 Neeser et al. .................. 428/69

* cited by examiner

*Primary Examiner*—Harold Pyon
*Assistant Examiner*—Elena Tsoy
(74) *Attorney, Agent, or Firm*—Donald T. Black (57) ABSTRACT

A thermal insulation panel exhibits little or no warping due to temperature differences between different portions of the panel. The panel comprises insulation material and an envelope for encapsulating the insulation material. The envelope comprises a base member and a cover member. The cover member is supported by the base member in a floating and sealing engagement with the base member. The cover member can slide relative to the base member to compensate for differential thermal expansion effects on the respective base member and cover member. In an alternative embodiment the cover member is adapted to be exposed to a temperature significantly below the temperature to which the base member is exposed. The cover member is formed of a metal having a low coefficient of thermal expansion to compensate for differential thermal expansion effects in the respective base member and cover member. The cover member and the base member are joined to provide the envelope with a hermetic seal.

10 Claims, 9 Drawing Sheets

LOW WARPAGE INSULATED PANEL DESIGN

FIELD OF THE INVENTION

The present invention relates to insulation panel systems. More particularly, it relates to an insulated panel design having improved resistance to warpage due to the thermal strain imparted by exposure of the panel to large temperature differences.

PRIOR ART

Insulated panel systems for use in freezing or for containing materials at very low temperatures have been practiced in many forms in the art. Such systems can be easily fitted to odd shapes, can be made lightweight, provide easy maintenance, and can be mass produced at low cost. When subjected to large temperature differences, however, thermal strains are developed in the panel envelope and in the internal insulation. These can result in undesired warpage and/or breakage of the panel due to the temperature difference between the top and bottom surfaces thereof.

The problem of insulation panel warpage is significant due to its potential for causing leaks from a freezer or container, damaging or deforming the insulation panels, and damaging or deforming components in the freezer or container that connect to the insulation panels. A good seal of the insulation panel when cold is critical to the proper operation of a freezer. Leaks can allow infiltration of air into the freezer which can affect its efficiency and lead to icing problems. The panels can be permanently deformed or cracked if not designed properly. Typically in a liquid nitrogen food freezer, for example, the insulation panel should have a fully welded construction to prevent oxygen from the air from condensing and concentrating inside the panel and posing a safety problem. Also, damage and cracks on the outside of a panel can allow moisture to enter the panel and cause degradation of the thermal insulation over time. The following patents illustrate various prior approaches to solving such problems.

In U.S. Pat. Nos. 4,116,150 and 4,170,952 to McCown there are disclosed cryogenic insulation systems for the storage of cryogenic liquefied gases which employ a metal membrane formed of a high nickel steel such as Invar.

In U.S. Pat. No. 4,155,482 to Swaney, there is disclosed a modular, bolt on, insulation system for use in the inner cargo hold of liquid natural gas (LNG) tanker ships. The panels are stacked in multiple sealed layers and are made of composites. There is a complicated system of joints and seams to completely cover the inner cargo hold. The modularity allows for replacement of damaged panels and inner vessel maintenance. The panels are not sealing surfaces but are simply applied to the inner vessel to provide thermal insulation between the cold LNG and the ambient environment.

In U.S. Pat. No. 4,527,844 to Klee, there is disclosed a thermally insulated chamber with an insulated door. The design of the chamber walls and door use flexible expansion joints, flexible support members, and limit the inner liner linear dimensions to control buckling and warping.

In U.S. Pat. No. 5,032,439 to Glicksman et. al. there are disclosed thermal insulation panels using evacuated powders enclosed in a ceramic glass envelope which is evacuated to a low pressure. This is a complicated design that was generated to form a panel without using CFC producing closed cell foams.

In U.S. Pat. No. 5,445,857 to Nowobilski, (assigned to the assignee of the present invention) there are described vacuum insulation panels that are provided with textured surfaces that localize thermal expansion. The large thermal strains that can produce cracking and warping are thereby avoided.

In U.S. Pat. No. 5,502,982 to Venetucci, there is disclosed the use of a tie pin to limit the deformation of the panel due to ice build up in the inner metal surfaces. The tie pins hold a plywood inner support next to the inner metal skin and are composed of a low heat leak composite material. Several of the pins are required for each panel. They are said to prevent the deformation of the inner surface of the insulation panel and thereby alleviate problems in a tunnel freezer operation caused by the deformation.

The above patents are specifically incorporated by reference herein.

The designs presented in accordance with this invention are significantly easier and cheaper to fabricate and construct than the prior designs and provide an essentially equivalent degree of thermal insulation. The prior art has tended to solve the problems of buckling and warpage by complicated mechanical means (tie pins or flexible expansion joints). The designs of this invention solve the problems of thermally generated warpage without significant mechanical complexity. The embodiments of this invention which employ Invar, preferably use it only on the portion of the panel which will be exposed to significant temperature variations from ambient temperature, in order to minimize cost.

SUMMARY OF THE INVENTION

In accordance with this invention new thermal insulation panel designs are provided having very low warpage when the inside surface of the panel is exposed to temperatures as low as −320° F. while the outside of the panel is at ambient temperature. The insulation panels of this invention have a simple modular design that is easy and inexpensive to fabricate.

The thermal insulation panel in accordance with a preferred embodiment of the invention exhibits little or no warping due to temperature differences between different portions of the panel. The panel comprises insulation material and an envelope encapsulating the insulation material. The envelope comprises a base member and a cover member which cooperate to envelope the insulation material. The cover member is supported by the base member in a floating and sealing engagement with the base member. The cover member can slide relative to the base member to compensate for differential thermal expansion effects when the respective base member and cover member are exposed to different temperatures.

Preferably in accordance with one embodiment the base member includes a peripheral slot directed inwardly of the panel and the cover member is captured within the slot and is free to slide in the slot within a given range of motion. In accordance with another embodiment the cover member includes a peripheral slot directed inwardly of the panel and the base member is captured within the slot so that the cover member is free to slide relative to the base member within a given range of motion.

A first sealing member is arranged about a peripheral edge of the cover member or the base member to provide a seal between the respective cover member or base member and the slot. Preferably the cover member and the base member are formed of metal and the first sealing member comprises a polymer.

In accordance with further preferred embodiments of this invention there is provided a thermal insulation panel which exhibits little or no warping due to temperature differences between different portions of the panel. The panel comprises insulation material and an envelope for encapsulating the insulation material. The envelope comprises a base member and a cover member. The cover member is adapted to be exposed to a temperature significantly below the temperature to which the base member is exposed. The cover member is formed of a metal having a low coefficient of thermal expansion to compensate for differential thermal expansion effects in the respective base member and cover member. The cover member and the base member are joined in a manner which provides the envelope with a hermetic seal.

Preferably the cover member and the base member are welded together along a peripheral seam of the panel. Preferably the seam is arranged away from the low temperature exposed portion of the panel.

It is therefore an object of the present invention to provide an improved insulation panel having resistance to warping due to differential thermal expansion effects (i.e. due to the effect upon different portions of the panel being exposed to different temperatures).

It is another object of the present invention to provide an insulation panel as above which is easy to fabricate.

It is another object of one alternative of the present invention to provide an insulation panel as above which includes a sliding seal to inhibit moisture infiltration into the panel.

It is another object of another alternative of the present invention to provide an insulation panel as above which includes a hermetically sealed envelope to prevent moisture infiltration into the panel.

The above and further objects and advantages of this invention will become apparent upon consideration of the following description thereof.

DETAILED DESCRIPTION OF THE PREFERRED EMBODIMENTS

Although the present invention will be described with reference to the embodiments shown in the drawings it should be understood that the present invention may be embodied in many forms of alternative embodiments. In addition, any suitable size, shape or type of materials or elements could be used.

The design of one preferred embodiment of the insulation panel 10 of this invention will be described by reference to FIGS. 1 through 5. The panel 10, which is shown by way of example, comprises a rectangular box or pan portion 12, which is preferably filled with polyurethane foam.

Figure 5:
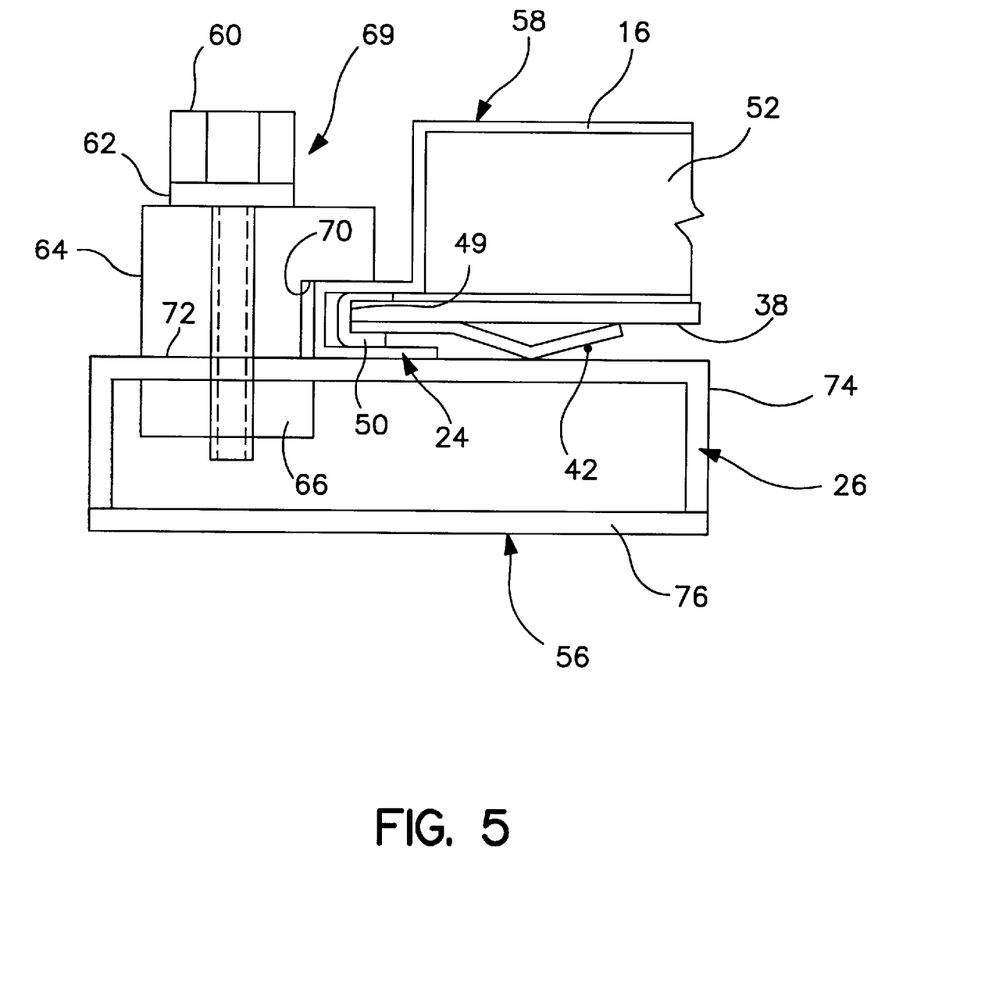
FIG. 5 is a partial cross-sectional view showing the mounting of a panel in accordance with this invention to a frame of a cryogenic freezer or container.
Figure 16:
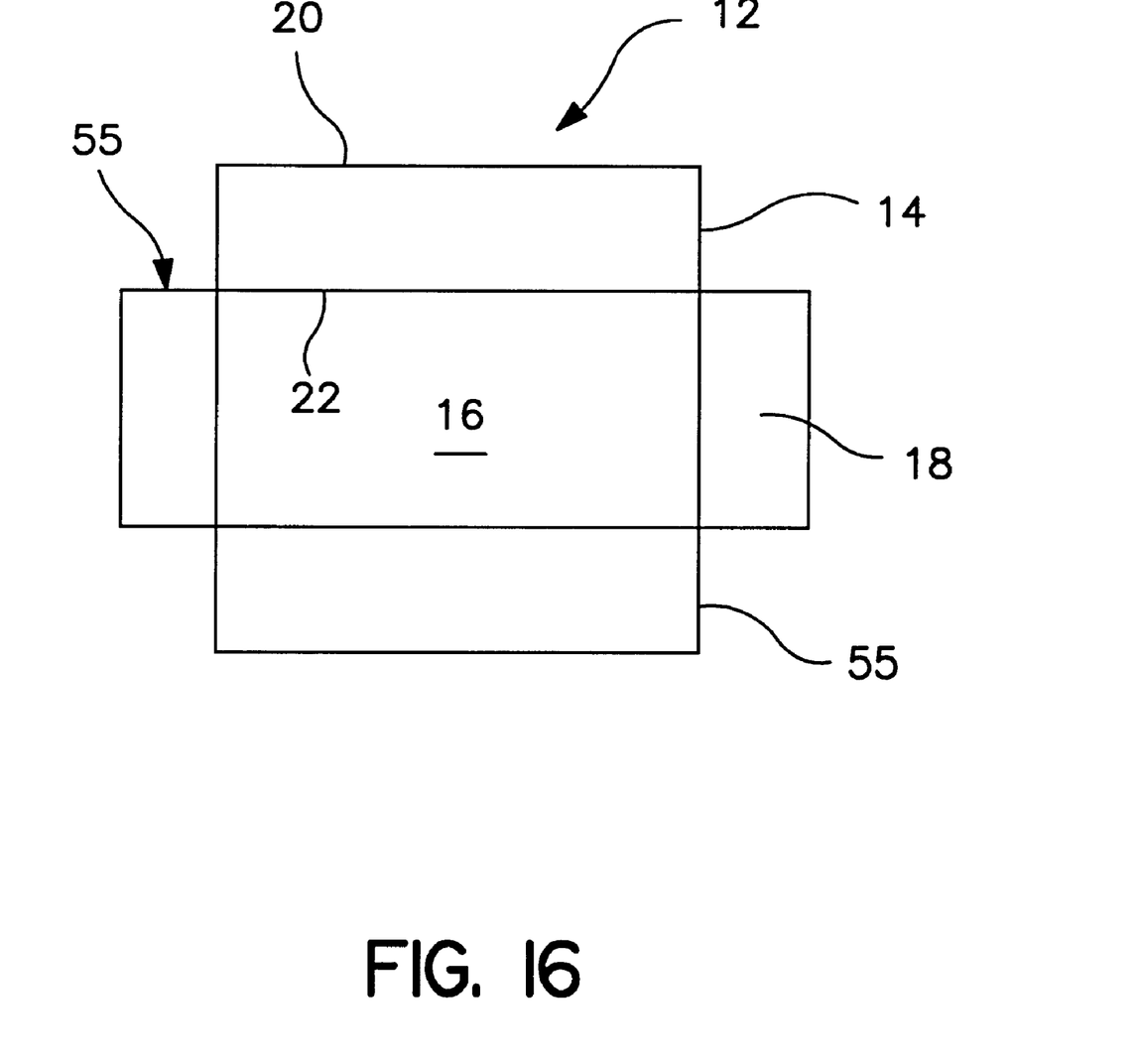
FIG. 16 is a top view of the box portion of a panel before folding and welding.

The bottom portion 12 of the box, as best shown in FIG. 16, is made by bending a flat sheet 14 of (e.g. 18 gauge) stainless steel. The bottom 16 of the box portion 12 has a rectangular shape in this exemplary embodiment. Four side wall flaps 18 extend out from the bottom 16 and are adapted to be bent upwardly from the bottom 16 about the bend lines 22 to form the box portion 12. The free edges 20 of the flaps 18, which are parallel to the bend lines 22, are bent to form an edge joint 24. The edge joint 24 of the panel 10 is a formed lip or flange which protrudes outwardly from the side wall 18, preferably in a direction parallel to the bottom 16 of the panel 10 and provides a flange like surface for clamping the panel 10 to a frame 26 of the freezer or container as best shown in FIG. 5.

Figure 1:
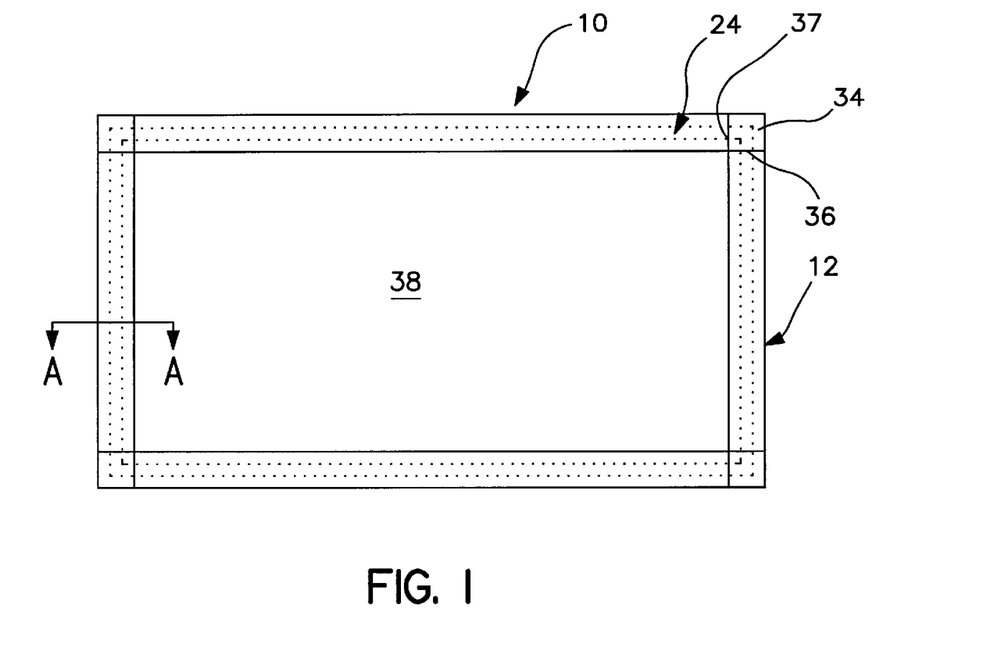
FIG. 1 is a top view of an insulation panel in accordance with a preferred embodiment of this invention.
Figure 2:
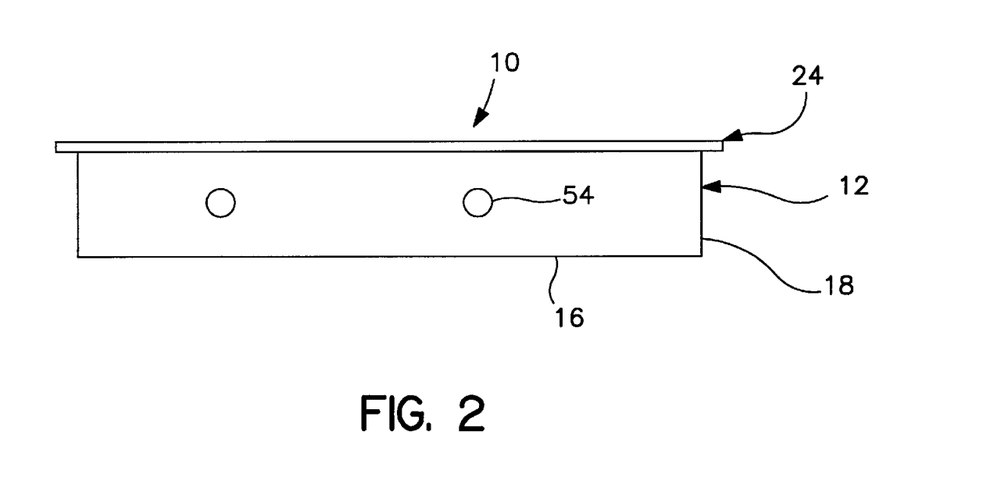
FIG. 2 is a side view of the insulation panel of FIG. 1.
Figure 3:
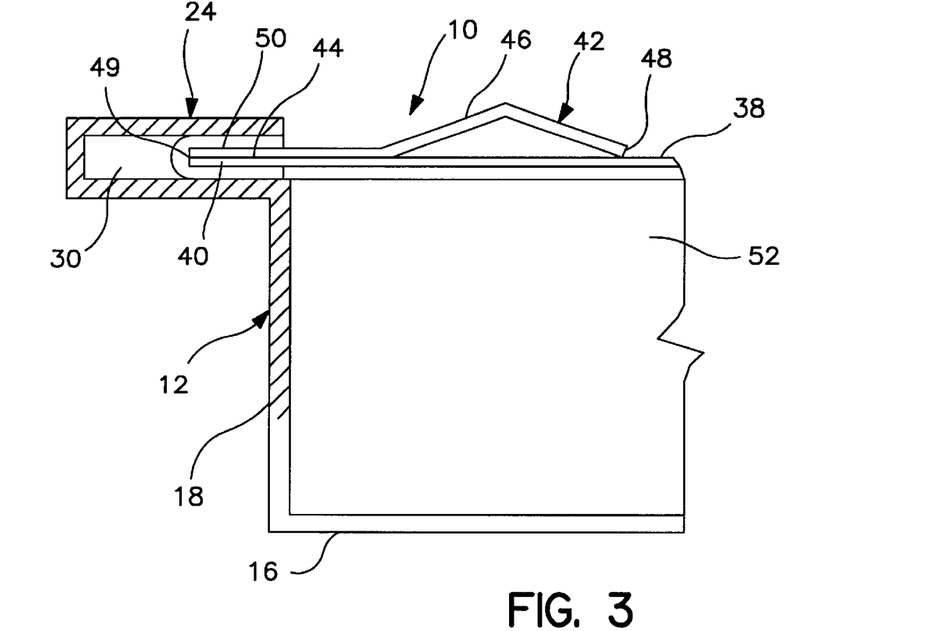
FIG. 3 is a partial cross-sectional view along the line A—A in FIG. 1 when a desired face of the panel is exposed to a very cold temperature.
Figure 4:
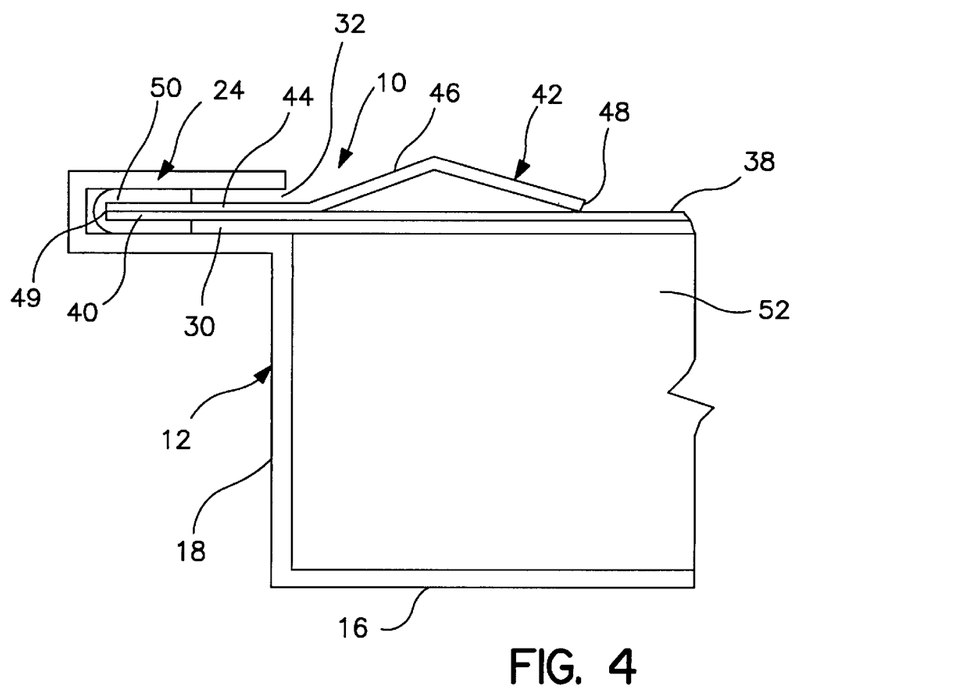
FIG. 4 is a partial cross-sectional view along the line A—A in FIG. 1 when a desired face of the panel is exposed to ambient temperature.

Referring now specifically to FIGS. 1, 3 and 4 the edge joint 24 which is formed from the free edges 20 of the side wall flaps 18 is shown in greater detail. The free edges 20 are bent first outwardly from the side walls in a direction parallel to the bottom 16 and then bent back again in the opposite parallel direction toward the side walls 18, so as to form a "U" shaped slot 30 which is open at the portion 32 of the slot 30 immediately adjacent to the walls 18. When the box 12 is formed from the sheet 14 and the edge joints 24 are formed in the free edge portions of the side walls 18, the corner portions 34 of the edge joint 24 are missing. Therefore it is preferable to secure corner edge portions 34 of the edge joints 24 to the edge joints of the side walls 18 along the joint lines 36 or 37. These corner edge portions 34 of the edge joint 24 are preferably welded along the joint lines 36 or 37 to the abutting edges of the flange 24 in the side walls 18; however, any desired conventional joining technique could be used. This provides a continuous flange 24 in order to have better sealing and support for the panel 10. In this embodiment, the corner portions 34 are preferably welded only along one of the joint lines 36 or 37 so that after forming the box 12 from the sheet 14 it is possible to spread the walls 18 apart in order to insert the cover sheet 38 into its flange 24 support.

The edge joint 24 is adapted to receive a preferably rectangular, floating cover sheet 38 which is slideably secured to the panel 12 by being captured in the peripheral slot 32. In order to avoid warping of panel 10, the cover member 38 floats within the peripheral edge joint 24 of the panel 10 at the face of the panel opposed to the panel bottom 16. The cover member 38 may be formed of any desired material, but it is preferably formed from a metal such as 18 gauge stainless steel.

Referring to FIGS. 3 and 4 the peripheral edge portion 40 of the cover member or sheet 38 has attached to it a peripheral metal seal 42. The seal 42 may be attached by any desired means, but preferably is spot welded by conventional means to the outer surface of the sheet 38. The seal has a first section 44 which overlies the sheet 38 in a parallel abutting manner. The welding of the seal 42 to the sheet occurs in this section 44. Extending inwardly from the first section 44 of the seal 42 is a spring section 46, which in this example has an inverted "V" shape with its free end 48 slideably engaging the sheet 38. While the metal seal arrangement 42 is the preferred embodiment of this invention any desired conventional seal 42, metal or polymeric, could be employed.

The outer edge 49 of the cover member 38 has a "U" shaped polymeric sealing gasket 50 comprised of a sealing tape secured to it by any desired means such as by an adhesive. The purpose of this gasket is to seal off the inside of the panel 12 to inhibit moisture and the atmosphere from entering. The gasket may be formed of any conventional gasket material but is preferably formed of a polymer such as ultra high molecular weight polyethylene.

To insert the floating cover sheet 38 into the edge joint 24 of the panel, the side walls 18 of the box 12 are pulled or sprung apart and the floating cover sheet 38 with the attached gasket 50 and peripheral metal seal 42 is then inserted into the edge joints 24. The edges 55 between the respective side walls 18 of the box 12 are then closed and welded to seal them, although any desired conventional sealing technique could be used, including without limitation the use of structural adhesives. The edge joint 24 is then crimped to sealingly engage the sliding gasket 50 and cover sheet 38.

Having completed the envelope of the panel 10 the insulation is then inserted to fill up the inside of the panel 10. The insulation may be any desired conventional insulation but is preferably a polymeric foam such as a closed cell polyurethane foam. The polyurethane foam preferably is foamed in place through holes 54 which may then be sealed with a suitable metal or polymer plug (not shown) such as a screw on plug. Alternatively the insulation may be placed in the box 12 prior to welding the edges of the box.

FIG. 3 shows a section of the panel 10 with the cover sheet 38 at a low temperature which would be experienced on the cold side of a freezer or cryogenic container, while the box 12 is at an ambient or room temperature. In this condition the cover member 38 shrinks more than the box 12 due to the temperature difference, so that its peripheral edge 49 moves inwardly of the panel 10 toward the side walls 18. Since the cover sheet 38 is floating there is no warpage of the panel as the aforenoted shrinkage is taken up by sliding movement of the cover sheet 38 relative to the panel box 12, within the edge joint 24. By contrast, FIG. 4 shows a section of the panel 10 with both the cover sheet 38 and the box 12 at an ambient room temperature before cooling down the freezer (not shown). In this condition the cover member 38 expands within the edge joint 24 without warpage of the panel since it is not rigidly attached to the side walls 18.

Referring to FIG. 5 a typical mounting arrangement in a freezer environment for the panel 10 of this invention is shown. The cold side of the freezer is on the side of the mounting arrangement shown by arrow 56. In this example the temperature could be at a temperature of about −100° F. The side of the freezer which is exposed to ambient room temperature is shown by arrow 58 and would be at a temperature of about 70° F. An insulated frame member 26 of the freezer is used to support one side of a panel 10. The panel is clamped to the frame member 26 by a series of clamps 59. Each clamp includes a clamp member 64 which is bolted by bolt 60 and washer 62 to the frame 26 using nut 66. The clamp member 64 is shaped like an inverted "L" so that a leg 68 has a face 70 which engages the edge joint 24 of the panel 10 to secure it to the frame member 26. The face 72 of the clamp member 68 serves as a stop to prevent over tightening of the clamp member 26 against the edge joint 24. If the edge joint 24 is squeezed too much it might prevent the cover sheet 38 from sliding thereby causing panel 10 to buckle.

The frame member 26 is composed of two pieces, a channel member 74 and a cover member 76 secured thereto by welding, bolting, adhesively or by any conventional securing means. Before the cover member 76 is secured access is provided to the bolts 60 and nuts 66 so they can be tightened. After the cover member is in place insulation such as a closed cell polyurethane foam is inserted into the member 26 to insulate it. The insulation 52 in the panel 10 in this support arrangement is sealed from the cold side of the freezer by the insulated frame member 26, the cover sheet 38, the peripheral metal seal 42 and the sealing tape gasket 50. The side wall of the freezer (not shown) comprises a plurality of such frame members 26 supporting a plurality of insulated panels 10.

The design of a second preferred embodiment of the insulation panel 100 of this invention will be described by reference to FIGS. 6 through 9. Elements corresponding to the previous embodiment have been given the same reference numbers. The panel 100, of this embodiment, which is shown by way of a further example, also comprises a rectangular box or pan portion 112, which is preferably filled with closed cell polyurethane foam.

The bottom portion 16 of the box 112, as best shown in FIG. 16, is made by bending a flat sheet 14 of (e.g. 18 gauge) stainless steel. The bottom 16 of the box portion 12 has a rectangular shape in this exemplary embodiment. Four side wall flaps 18 extend out from the bottom 16 and are adapted to be bent upwardly from the bottom 16 about the bend lines 22 to form the box portion 112. The free edges 20 of the flaps 18, which are parallel to the bend lines 22, are bent to form an edge flange 150. The edge flange 150 of the panel 100 is a formed lip or flange which protrudes outwardly from the side wall 18, preferably in a direction parallel to the bottom 16 of the panel 10 and provides a flange like surface for sliding within the edge joint 124 formed in the cover member 138.

Figure 6:
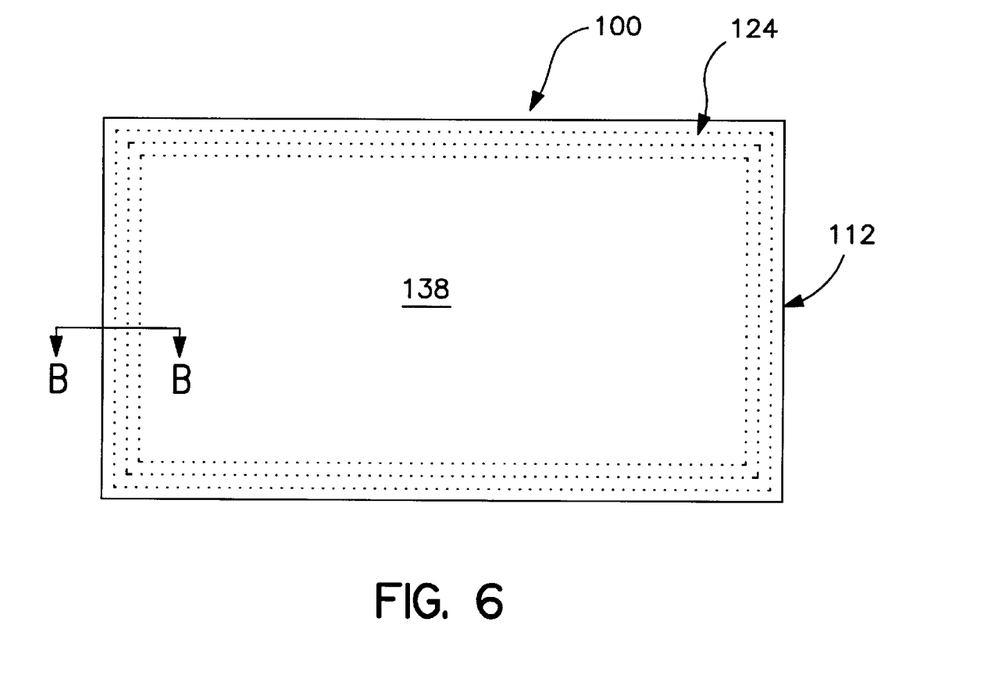
FIG. 6 is a top view of an insulation panel in accordance with an alternative preferred embodiment of this invention.
Figure 7:
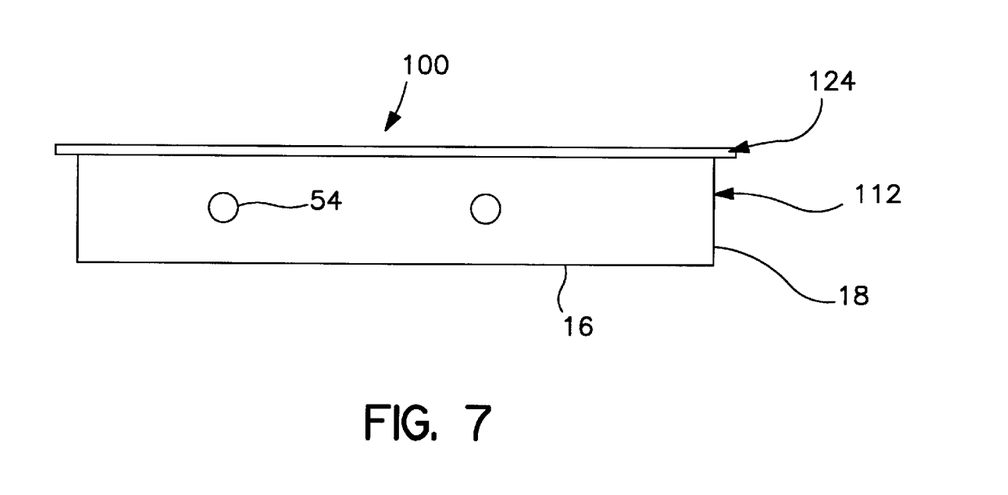
FIG. 7 is a side view of the insulation panel of FIG. 6.
Figure 8:
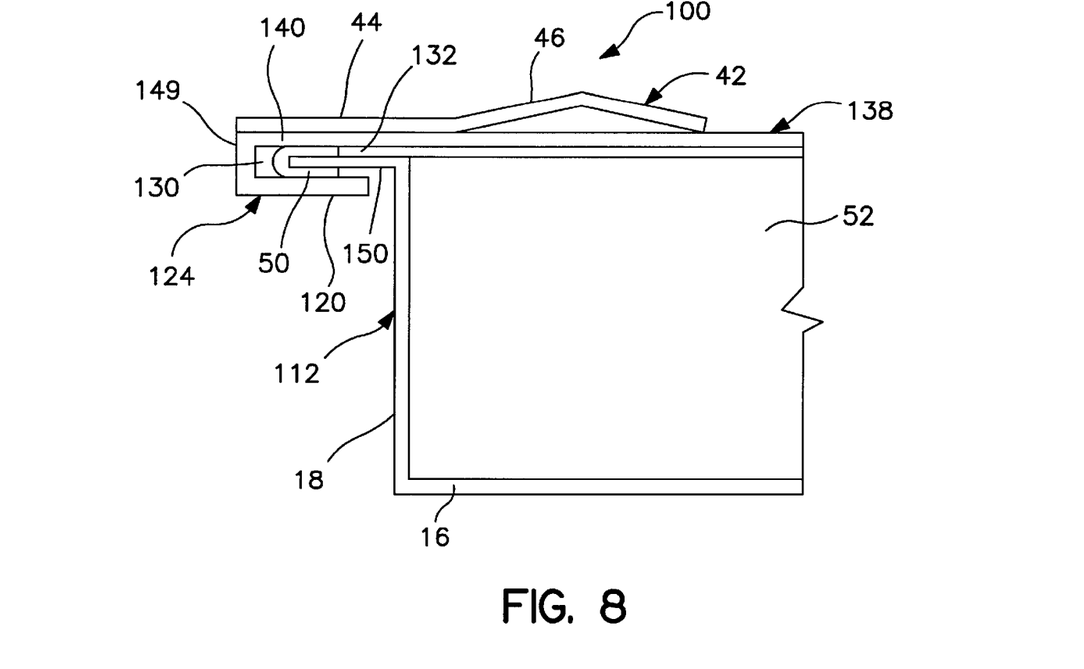
FIG. 8 is a partial cross-sectional view along the line B—B in FIG. 6 when a desired face of the panel is exposed to a very cold temperature.
Figure 9:
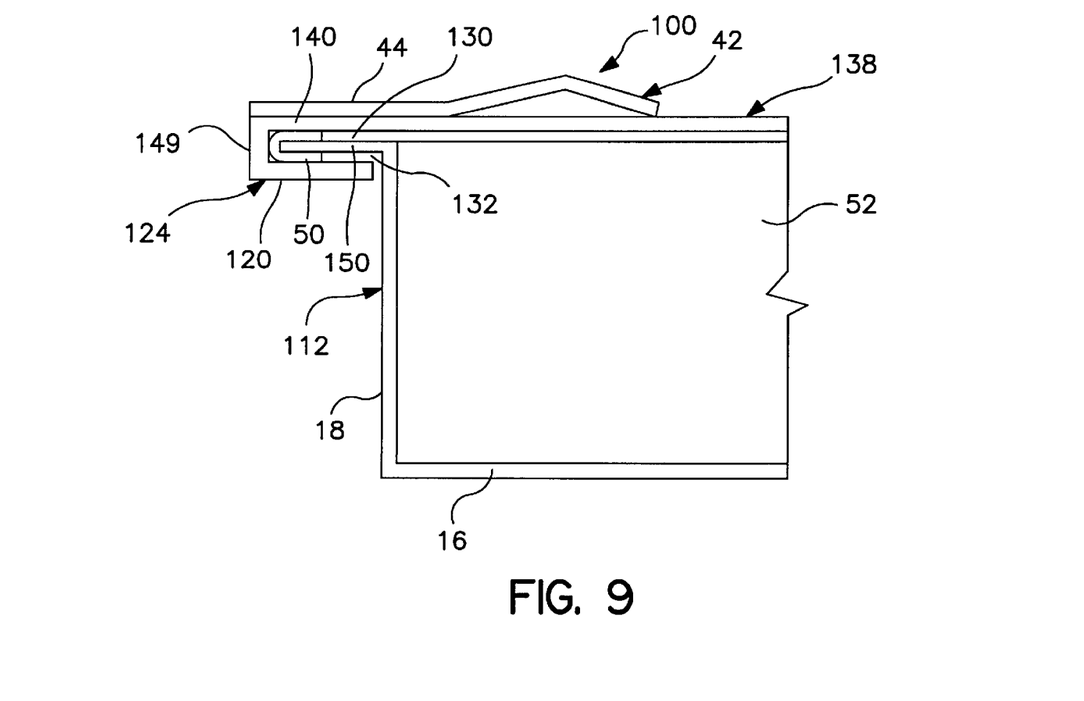
FIG. 9 is a partial cross-sectional view along the line B—B in FIG. 6 when a desired face of the panel is exposed to ambient temperature

Referring now specifically to FIGS. 6, 8 and 9 the edge joint 124 which is formed from the peripheral edges 120 of the cover member 138 is shown in greater detail. The peripheral edges 120 are bent 180° to form a "U" shaped slot 130 and any excess material is cut away. The slot 130 is open at the portion 132 of the slot 130 immediately adjacent to the walls 18. When the box 12 is formed from the sheet 14 and the flanges 150 are formed in the free edge portions of the side walls 18, the corner portions (not shown) of the flanges 150 are missing. Therefore it is preferable to secure corner edge portions (not shown) to the flanges 150 by welding however, any desired conventional joining technique could be used. This provides a continuous flange 150 in order to have better sealing for the panel 100. In this embodiment, the corner portions (not shown) are preferably welded to the flanges 150 so that after forming the box 12 from the sheet 14 it is possible to push the walls 18 inwardly in order to insert the flanges 150 into the edge joint 124 of the cover sheet 138.

The edge joint 124 is adapted to receive the peripheral flange 150, which is slideably secured within the peripheral slot 132. In order to avoid warping by panel 100 the cover member 138 floats about the flanges 150 of the panel 100 at the face of the panel opposed to the panel bottom 16. The cover member 138 may be formed of any desired material, but it is preferably formed from a metal such as 18 gauge stainless steel.

Referring to FIG. 9 the peripheral edge portion 140 of the cover member or sheet 138 in this embodiment is preferably secured to a frame member 156 by discrete "L" shaped clamps 164 which are bolted to the frame member 156 by bolt 160 and nut 166. If desired the clamps 164 could be turned over and the side of the frame member 156 to which they are clamped made shorter to minimize the projection of the clamps 164 above the surface of the sheet 138. This would provide a less obstructed surface for cleaning. The peripheral edge portion 140 in this embodiment is sealed to the frame member 156 by a polymer seal 165 preferably formed of ultra high molecular weight polyethylene. These panels 100 are particularly suitable for the floors of freezer tunnels wherein it is desired that they be easily cleanable. While the polymer seal arrangement 165 is the preferred approach for this embodiment of the invention any desired conventional seal 165, metal or polymeric, could be employed.

The outer edge 49 of the flange 150 has a "U" shaped polymeric sealing gasket 50 comprised of a sealing tape secured to it by any desired means such as by an adhesive. The purpose of this gasket is to seal off the inside of the panel 100 to inhibit moisture and the atmosphere from entering. The gasket may be formed of any conventional gasket material but is preferably formed of a polymer such as ultra high molecular weight polyethylene.

To insert the flange 150 of the box 112 into the edge joint 124 of the cover member 138, the side walls 18 of the box 12 are pushed inwardly and the flange 150 with the attached gasket 50 is then inserted into the edge joints 124 of the cover member. The edges 55 between the respective side walls 18 of the box 112 are then closed and welded to seal them, although any desired conventional sealing technique could be used, including without limitation the use of structural adhesives. The edge joint 124 in the cover member 138 is then crimped to sealingly engage the sliding gasket 50 and flange 150.

Having completed the envelope of the panel 100 the insulation is then inserted to fill up the inside of the panel 100 as described in the previous embodiment.

FIG. 9 shows a section of the panel 100 with the cover sheet 138 at a low temperature which would be experienced on the cold side of a freezer or cryogenic container, while the box 112 is at an ambient or room temperature. In this condition the cover member 138 shrinks more than the box 112 due to the temperature difference, so that its peripheral edge 149 moves inwardly of the panel 100 toward the side walls 18. Since the cover sheet 138 is floating there is no warpage of the panel as the aforenoted shrinkage is taken up by sliding movement of the flange 150 relative to the cover member 138, within the edge joint 124. By contrast, FIG. 8 shows a section of the panel 100 with both the cover sheet 138 and the box 112 at an ambient room temperature before cooling down the freezer (not shown). In this condition the cover member 138 expands without warpage of the panel since it is not rigidly attached to the side walls 18 flange 150.

The second embodiment of this invention set forth in FIGS. 6 through 9 with the edge joint 124 forming part of the floating cover member provides an inside surface which is easy to wash for applications where this is required, while still maintaining the floating low warpage type design. The first and second embodiments are particularly useful for use in $CO_2$ type freezers where hermetic sealing of the insulation panels 10 or 100 is not absolutely required.

Third and fourth designs will now be described by reference to FIGS. 10 through 15, which comprise fully enclosed all welded panels 200 and 300. These panels would be more suitable for use with liquid nitrogen freezers or containers where the tendency to encounter thermal warpage problems described above is the most pronounced, due to the much lower temperatures involved in the freezer. The all welded designs prevent oxygen enrichment of condensation on the inside of the panel 200 or 300. The designs utilize a low coefficient of thermal expansion (CTE) material such as Invar 36 for the portion of the panel exposed to the low temperatures and a stainless steel such as type 304 for the portion of the panel exposed to room temperature to achieve a very low warpage under extreme conditions. Since Invar is expensive and is available in limited shapes, using Invar for preferably only the portion of the panel exposed to significant temperature variation from ambient reduces the cost of the panel 200 or 300.

The low coefficient of thermal expansion (or contraction) material used in accordance with this invention preferably has a linear thermal expansion (or contraction) comprising as determined by the formula $(L_t-L_a)/L_a$ of from about $-60\times10^{-5}$ inch/inch to about 0 inch/inch, at a temperature of about $-300°$ F., where $L_a$ is the ambient temperature to which a portion of the panel 200 or 300 is exposed, (e.g. a 68° F. room temperature) and $L_t$ is the temperature to which the remaining portion of the panel 200 or 300 will be exposed. Invar 36 has a linear thermal expansion of about $-39\times10^{-5}$ inch/inch and therefore is quite suitable for this application.

Figure 10:
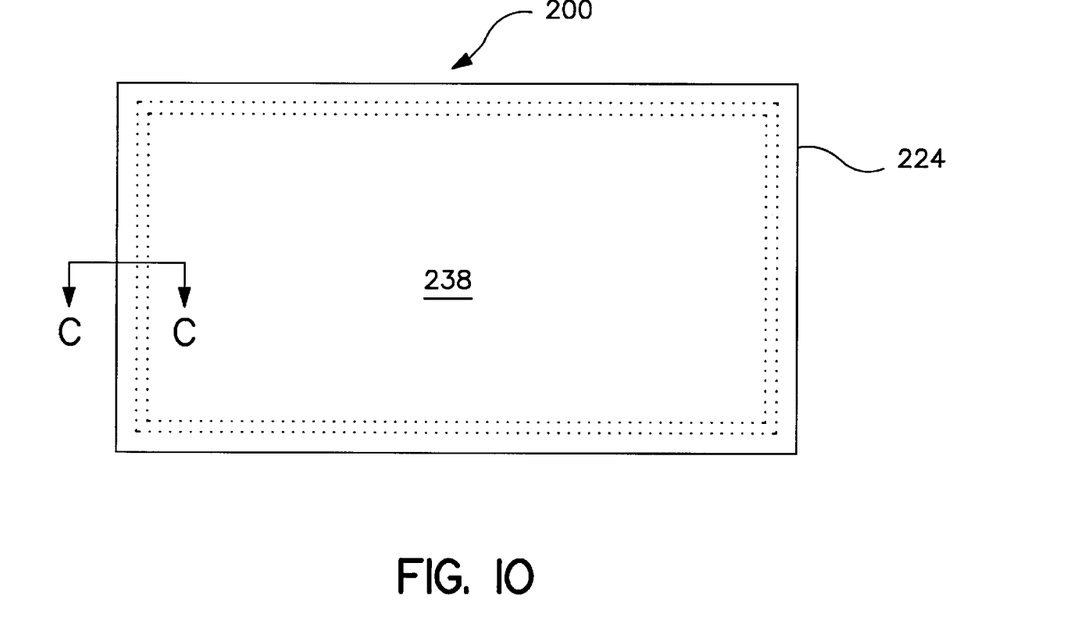
FIG. 10 is a top view of an insulation panel in accordance with a further alternative preferred embodiment of this invention.
Figure 11:
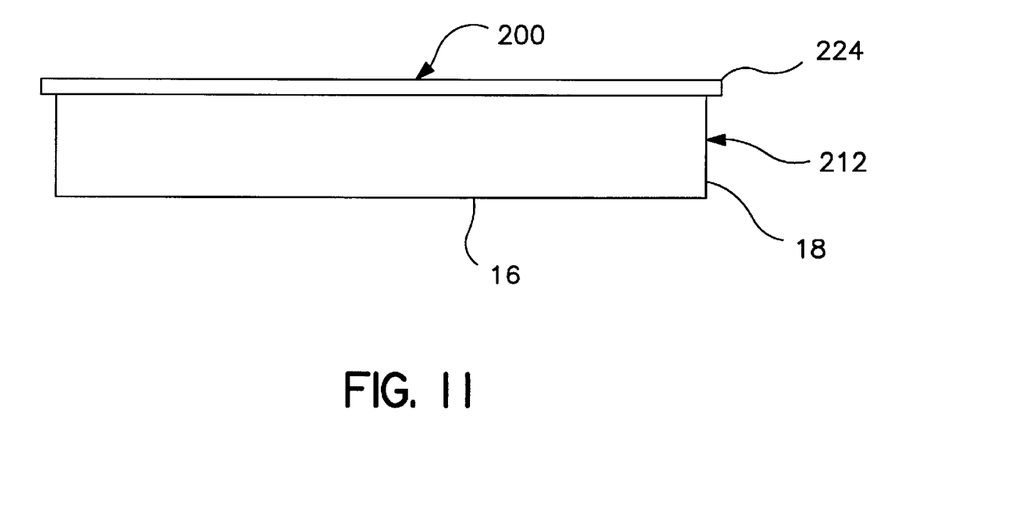
FIG. 11 is a side view of the insulation panel of FIG. 10.

The design of a third preferred embodiment of the insulation panel 200 of this invention will now be described by reference to FIGS. 10 through 12. Elements corresponding to the previous embodiments have been given the same reference numbers. The panel 200, of this embodiment, which is shown by way of a further example, also comprises a rectangular box or pan portion 212, which is preferably filled with closed cell polyurethane foam.

The bottom portion 16 of the box 212, as best shown in FIG. 16, is made by bending a flat sheet 14 of (e.g. 18 gauge) stainless steel. The bottom 16 of the box portion 12 has a rectangular shape as in the previous embodiment. Four side wall flaps 18 extend out from the bottom 16 and are adapted to be bent upwardly from the bottom 16 about the bend lines 22 to form the box portion 212. The free edges 20 of the flaps 18, which are parallel to the bend lines 22, are bent to form an edge flange 150. The edge flange 150 of the panel 200 is a formed lip or flange which protrudes outwardly from the side wall 18, preferably in a direction parallel to the bottom 16 of the panel 10 and provides a flange like surface for welding to the special metal cover sheet 238.

When the box 212 is formed from the sheet 14 and the flanges 150 are formed in the free edge portions of the side walls 18, the corner portions (not shown) of the flanges 150 are missing. Therefore it is preferable to secure corner edge portions (not shown) to the flanges 150 by welding. This provides a continuous flange 150 in order to have better sealing of the panel 200.

In order to avoid warping of panel 200, the cover member 238, which is the portion of the panel 200 exposed to low cryogenic temperatures, is preferably formed out of Invar 36 metal sheet. The box 212 is preferably made of SS 304 stainless steel, and is adapted to be placed on the warm side of the Invar cover member 238. The metal seal 42 in this embodiment is preferably made of either half hard SS 301 spring steel or Invar. As in the previous embodiments it is placed on the cold side of the Invar cover sheet 238. A seam weld 250 is then applied to the joint between the flange 150 and the edge 252 of the cover sheet 238 along the entire perimeter of the cover sheet 238 and flange 150. The edges 55 between the respective side walls 18 of the box 12 as in FIG. 16 are closed and welded to seal them and provide a hermetically sealed panel 200.

Invar 36 is composed of iron and 36% nickel. Due to this composition it is very weldable with most stainless steels including SS 304. During cool down in a freezer the Invar has very small contraction due to its low CTE (about a factor of 8 less than stainless steel) and thus the panel has very low thermal generated distortion.

Figure 12:
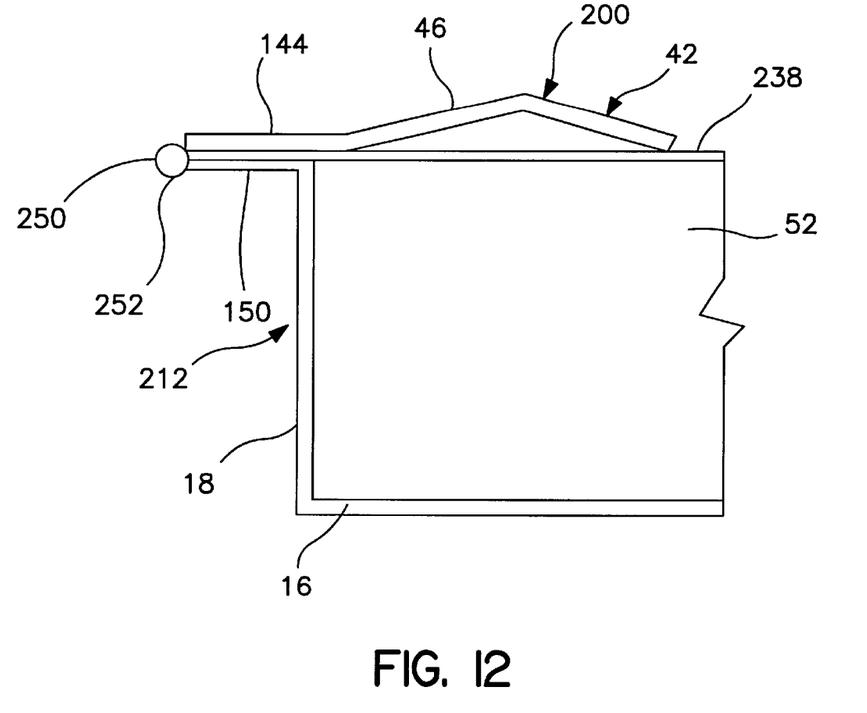
FIG. 12 is a partial cross-sectional view along the line C—C in FIG. 10.

Referring to FIG. 12 the peripheral edge portion 252 of the cover member or sheet 238 has attached to it a peripheral metal seal 42 which will be described in greater detail. The seal 42 may be attached by any desired means, but preferably is spot welded by conventional means to the outer surface of the sheet 238. The seal 42 has a first section 44 which overlies the sheet 238 in a parallel abutting manner. The welding of the seal 42 to the sheet occurs in this section 44. Extending inwardly from the first section 44 of the seal 42 is a spring section 46, which in this example has an inverted "V" shape with its free end 48 slideably engaging the sheet 238. While the metal seal arrangement 42 is the preferred approach for this embodiment of the invention any suitable seal 42 could be employed.

Having completed the envelope of the panel 200 the insulation is then inserted to fill up the inside of the panel 200 as described in the previous embodiments. However, due to the weld position, if desired, the insulation could be inserted (e.g. in sheet form) prior to welding on the cover sheet 238, preferably with, if required, appropriate cooling of the portions of the panel away from the weld zone.

The design of a fourth preferred embodiment of the insulation panel 300 of this invention will now be described by reference to FIGS. 13 through 15. Corresponding elements to the previous embodiments have been given the same reference numbers. The panel 300, of this embodiment, which is shown by way of a further example, also comprises a rectangular box or pan portion 312, which is preferably filled with closed cell polyurethane foam.

This embodiment is similar to the third embodiment except the inside cover body 338 is box shaped similar to the box in FIG. 16 and is formed out of bent Invar sheet with the corners welded closed. The box is then insulated and a SS 304 stainless steel outside base member 312 is welded to the cover body 338 to completely and hermetically seal the insulation panel. This design has the advantage of locating the Invar to SS 304 weld joint 350 on the warm side of the panel 300. In the previous design if the weld joint 250 gets sufficiently cold it can be a source of warpage of the panel 200 due to the different CTE's of Invar and SS 304. Again, during cool down the Invar has very small contraction due to its low CTE and the panel 300 of this embodiment has very low thermal generated distortion.

The box shaped cover member 338 of this embodiment is made in a manner similar to that shown for the previous embodiments in FIG. 16 for the box shaped member 12 except that the material of the cover member 338 is Invar instead of stainless steel. The base member 312 also has a box type shape except that the side walls 318 are shorter and the base member 312 is adapted to nest within the cover member 338 providing a peripheral seam 352 where the cover member 338 is welded at 350 to the base member 312.

As in the previous embodiment in order to avoid panel 300 warping, the cover member 338, which is the portion of the panel 200 exposed to low cryogenic temperatures, is preferably formed out of Invar 36 metal sheet. The base member 312 is preferably made of SS 304 stainless steel, and is adapted to be placed on the warm side of the Invar cover member 338. The metal seal 42 in this embodiment is preferably made of either half hard SS 301 spring steel or Invar. As in the previous embodiments it is welded to the cold side of the Invar cover sheet 338. A seam weld 350 is then applied to the joint 352 between the cover member 338 and the base member 312 along the entire perimeter of the cover member 338. The edges between the respective side walls of the box 338 are closed and welded to seal them and provide a hermetically sealed panel 300.

Figure 15:
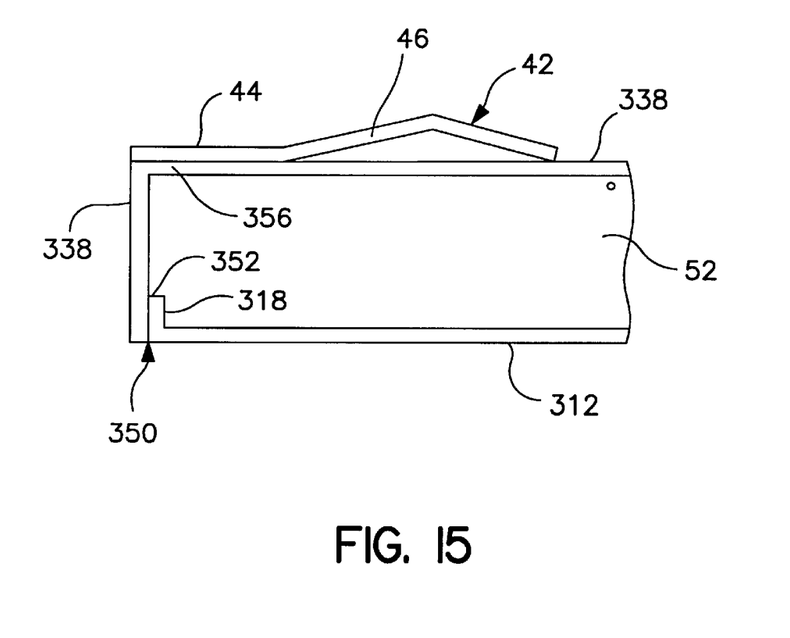
FIG. 15 is a partial cross-sectional view along the line D—D in FIG. 13.

Referring to FIG. 15 the peripheral edge portion 356 of the cover member 338 has attached to it a peripheral metal seal 42 which will be described in greater detail. The seal 42 may be attached by any desired means, but preferably is spot welded by conventional means to the outer surface of the sheet 238. The seal 42 has a first section 44 which overlies the member 338 in a parallel abutting manner. The welding of the seal 42 to the sheet occurs in this section 44. Extending inwardly from the first section 44 of the seal 42 is a spring section 46, which in this example has an inverted "V" shape with its free end 48 slideably engaging the sheet 238. While the metal seal arrangement 42 is the preferred approach for this embodiment of the invention any suitable seal 42 could be employed.

Figure 13:
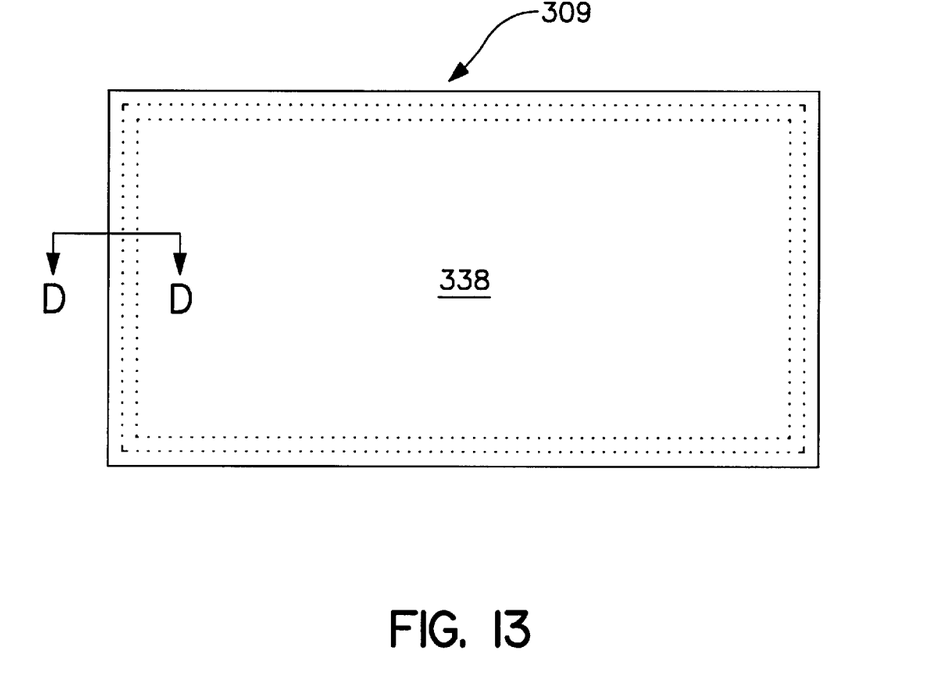
FIG. 13 is a top view of an insulation panel in accordance with a further alternative preferred embodiment of this invention.
Figure 14:
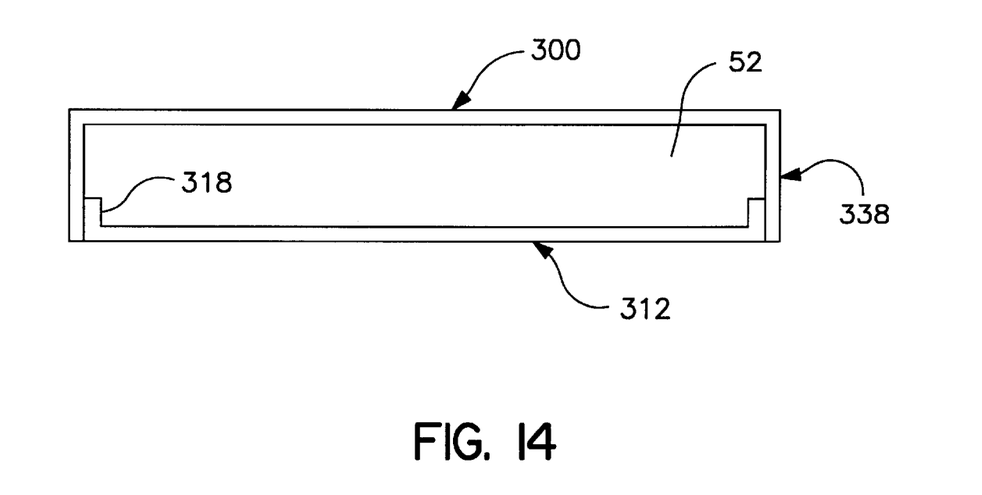
FIG. 14 is a side view of the insulation panel of FIG. 13.

The designs of this invention differ from prior art approaches in that they use either a sliding seal design shown in FIGS. 1 through 9 or they use an all welded design based on the low CTE material Invar 36 as shown in FIGS. 10 through 15. The sliding seal design shown in FIGS. 1–5 will limit infiltration of water, air and other unwanted material into the panel 10 due to the taped joint 24 and its location on the inside of the freezer. The sliding seal design shown in FIGS. 6–9 will limit infiltration of water, air and other unwanted material into the panel due only to the taped joint. The all welded design of FIGS. 10 through 15 are completely welded and thus eliminate any infiltration. They utilize the unique material Invar 36 which has very low CTE and is easily weldable to stainless steel 304. Care must be taken to preferably prevent the Invar to stainless weld joint 250 or 350 from getting cold enough to cause warpage. This is accomplished by either adding frame 26 insulation as in FIG. 5 when using the welded design shown in FIGS. 10–12 or by simply moving the stainless to Invar weld joint to the warm side of the panel as shown in FIGS. 13–15.

While a rectangular box 11 is preferred, the box 11 may have any desired shape or form that could be used for insulation panels. While closed cell polyurethane foam is the preferred insulation material, any desired insulation material conventionally used for insulation panels can be employed, including without limitation, fiber glass, ceramics, other low thermal conductivity materials or vacuum. While stainless steel is the preferred material for use in the panel embodiments of FIGS. 1–4, 6–9 and in portions of the panels of FIGS. 10–12 and 13–15, any desired metal or alloy conventionally used for insulation panels could be employed. While Invar 36 nickel iron alloy is the preferred material for use in the cold portions of the panels of FIGS. 10–12 and 13–15 any desired metal or alloy or other material having a low coefficient of thermal expansion (e.g. less than about −60× $10^{-5}$ inch/inch as described previously) could be employed.

The panel designs of this invention can be extended to shapes other than flat rectangular panels. The panels could be any plane shape or curved in shape and still benefit from this invention. The insulation panels of this invention can be used to provide insulation for applications in which one side is exposed to temperatures below −320° F. These panels could also be used for hot applications where the inside surface is hotter than ambient, such that the opposed sides of the panel are exposed to a sufficient difference of temperatures that warping could otherwise result. Other low CTE alloys (for example Invar 45) could be used in the fully welded designs.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the spirit and scope of the appended claims.

What is claimed is:

1. A thermal insulation panel which exhibits little or no warping due to temperature differences between different portions of said panel, comprising:
   insulation material;
   an envelope encapsulating said insulation material, said envelope comprising a base member and a cover member;
   said cover member being supported by said base member in a floating and sealing engagement with said base member, so that said cover member can slide relative to said base member to compensate for differential thermal contraction effects when said respective base member and cover member are exposed to different temperatures,
   wherein said base member includes a peripheral slot directed inwardly of said panel and wherein said cover member is captured within said slot and is free to slide in said slot within a given range of motion.

2. A thermal insulation panel as in claim 1 wherein a first sealing member is arranged about a peripheral edge of said cover member to provide a seal between said cover member and said slot.

3. A thermal insulation panel as in claim 2 wherein a second sealing member is attached to the outside of said cover member adjacent to said peripheral edge for sealingly engaging a frame member of a device to which said panel can be attached.

4. A thermal insulation panel as in claim 3 wherein said cover member and said base member are formed of metal and wherein said first sealing member comprises a polymer and wherein said second sealing member is formed of metal.

5. A thermal insulation panel as in claim 3 wherein said base member has a box like shape with a base and sides attached to the base for substantially surrounding said insulation material and wherein said slot is formed adjacent the free ends of said sides, with the opening of said slot being directed inwardly of said base member so as to capture said cover member.

6. A thermal insulation panel which exhibits little or no warping due to temperature differences between different portions of said panel, comprising:
   insulation material;
   an envelope encapsulating said insulation material, said envelope comprising a base member and a cover member;
   said cover member being supported by said base member in a floating and sealing engagement with said base member, so that said cover member can slide relative to said base member to compensate for differential thermal contraction effects when said respective base member and cover member are exposed to different temperatures,
   wherein said cover member includes a peripheral slot directed inwardly of said panel and wherein said base member is captured within said slot so that said cover member is free to slide relative to said base member within a given range of motion.

7. A thermal insulation panel as in claim 6 wherein said base member includes a peripheral flange adapted to be captured in said slot and wherein a first sealing member is arranged about a peripheral edge of said flange to provide a seal between said base member and said slot in said cover member.

8. A thermal insulation panel as in claim 7 wherein a second sealing member is attached to the outside of said cover member adjacent to the peripheral edge of said cover member for sealingly engaging a frame member of a device to which said panel can be attached.

9. A thermal insulation panel as in claim 8 wherein said cover member and said base member are formed of metal and wherein said first sealing member comprises a polymer and wherein said second sealing member is formed of metal.

10. A thermal insulation panel as in claim 3 wherein said base member has a box like shape with a base and sides attached to the base for substantially surrounding said insulation material and wherein said flange is formed adjacent the free ends of said sides and extends outwardly of said panel, and wherein the opening of said slot is directed inwardly of said panel so as to capture said flange of said base member.

* * * * *